(No Model.) 2 Sheets—Sheet 1.
S. H. SHORT.
DIRECTLY CONNECTED MOTOR FOR CARS.
No. 491,667. Patented Feb. 14, 1893.
FIG. I.
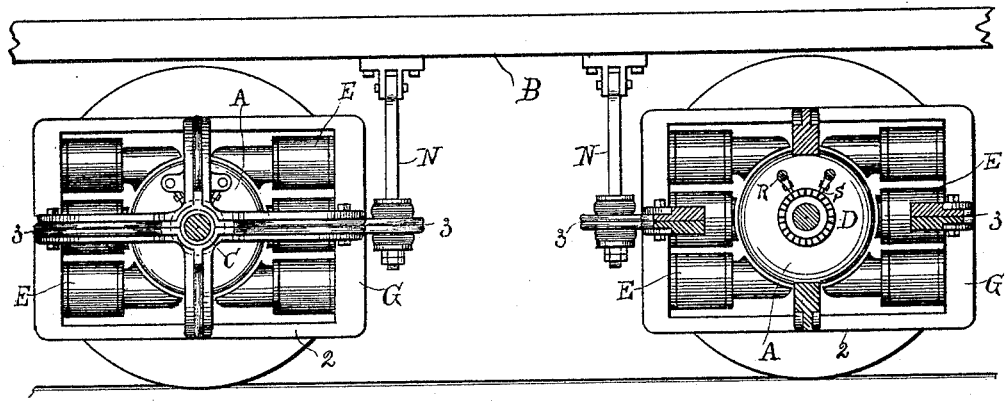
FIG. II.
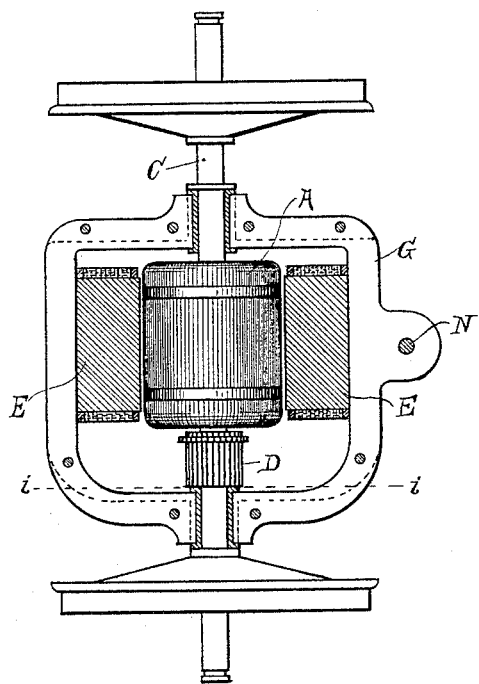
Witnesses
R. E. Auld.
S. G. Nottingham
Inventor.
S. H. Short.
By H. A. Seymour
Atty.

(No Model.) 2 Sheets—Sheet 2.
S. H. SHORT.
DIRECTLY CONNECTED MOTOR FOR CARS.
No. 491,667. Patented Feb. 14, 1893.
FIG. III.
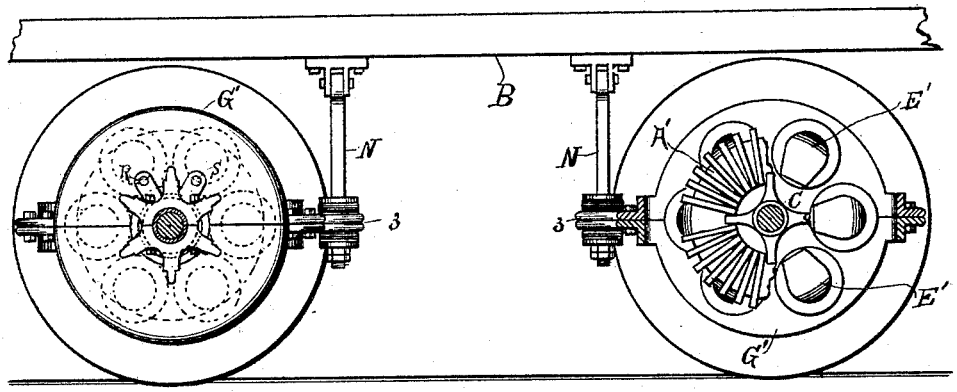
FIG. IV.
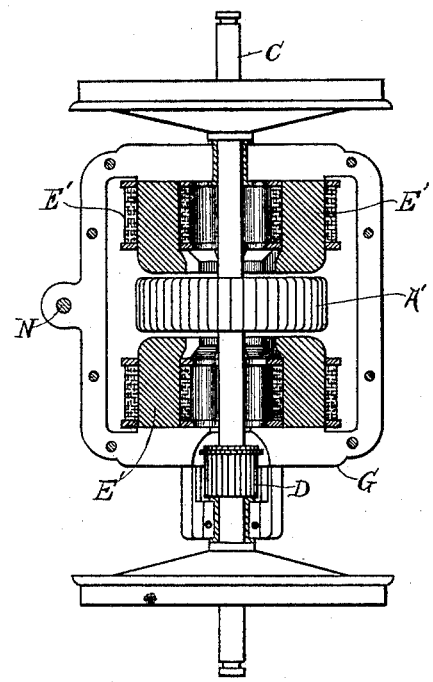
Witnesses
R. E. Auld.
S. G. Nottingham
Inventor
S. H. Short.
By H. A. Seymour
Atty.

UNITED STATES PATENT OFFICE.

SIDNEY H. SHORT, OF CLEVELAND, OHIO, ASSIGNOR TO THE SHORT ELECTRIC RAILWAY COMPANY, OF SAME PLACE.

DIRECTLY-CONNECTED MOTOR FOR CARS.

SPECIFICATION forming part of Letters Patent No. 491,667, dated February 14, 1893.

Application filed March 30, 1891. Serial No. 387,005. (No model.)

*To all whom it may concern:*

Be it known that I, SIDNEY H. SHORT, of Cleveland, in the county of Cuyahoga and State of Ohio, have invented certain new and useful Improvements in Directly-Coupled Electric-Motor Cars; and I do hereby declare the following to be a full, clear, and exact description of the invention, such as will enable others skilled in the art to which it appertains to make and use the same.

This invention relates to electric motor cars, or cars propelled by electricity, in which one or more propelling motors have their respective armatures axially placed with reference to a car axle and directly coupled or connected therewith. By axially placed is to be understood that the axes of the armature and car axle are coincident or nearly so. By directly coupled or connected is to be understood that the driving connection imparts one revolution to the car axle for each revolution of the armature.

In the application to car propulsion of directly coupled motors placed axially, difficulties are encountered by reason of the weight of the electric motors which are required to give economically the proper power at a low revolution of the armature and of the contracted space under the car body which is available for the motor. In accordance with the present invention these difficulties are lessened or removed by the arrangement of a multipolar electric motor of three or more pairs of poles so that the said magnets which react with an axially placed and direct coupled armature are substantially above the lowermost point of the said armature. It is advantageous to have all of these magnets placed horizontally parallel to one another. This and other features which are hereinafter described form the subject of special claim.

By the use of a motor with three or more pairs of poles it is possible without any increase in the iron of the motor to obtain more work with equal efficiency under a given electro-motive force than by the use of a two pole or a four pole machine. In the case of a six pole machine moreover if the magnets have each the same strength as in the case of a two or a four pole machine, the counter-electromotive force with the same revolution is correspondingly increased.

In the accompanying drawings which form part of this specification, Figure I is a partial view in section and elevation of a direct coupled electric motor car in accordance with the present invention, Fig. II is a partial plan of the same, Fig. III is a partial view in section and elevation of another form, also within the invention, and Fig. IV is a partial plan partly in horizontal section of this latter form.

The armature A or A' is composed of a soft iron core wound with bobbins of insulated wire, the armature A being of the drum or flat ring type and the armature A' of the "Brush" type. The bobbins are connected in closed series and from the junction wires are led to the strips of the commutator D. The armature A or A' is not only axially placed with reference to the car axle C and directly coupled therewith, but it is mounted thereon. While a mounting on the axle is considered the most beneficial arrangement it is to be observed that the invention so far as the axial position and direct coupling of the motor is concerned extends to such features in general irrespective of the mounting of the armature on the car axle. The direct driving connection is as shown effected through the key or means whereby the armature is fastened on the car axle which latter constitutes therefore the armature shaft.

The field magnets in both forms of motor shown consist of three pairs (although a larger number of pairs may be used) and are arranged in horizontal planes parallel with one another above the lowest point of the armature A. or A'. As shown in Figs. I and II the magnets E project from a frame G which forms the yokes between the magnets and also supports the same, being as shown journaled upon the car axle C or armature shaft and held from rotation by the connection N with the car body B, or other convenient means may be arranged to hold the field magnets from rotation. The said frame G it will be observed forms a magnetic yoke between the magnets on the opposite sides of the car axle, and the part 2 below the magnets also serves as a protection to the motor being interposed between it and the ground. In these figures (namely Figs. I and II) the magnets are at right angles to the length of the car axle. The frame G is made in two parts, (the division being at 3) to facilitate the application to the car axle.

As shown in Figs. III and IV the magnets E' project from a frame G' which forms the yokes between the magnets and also supports the same being as shown journaled upon the car axle C and held from rotation by the connection N with the car body B. The frame G' is also divided at 3 to facilitate the application to the car body.

The commutator D in both forms of motor is fast on the car axle C or armature shaft and rotates in contact with the brushes R and S which are placed sixty degrees apart for the six pole machine shown. The armature coils are suitably cross connected. The current is supplied to and cut off from the motor in any known or suitable way. The armature and field are connected with each other in series.

In the foregoing description the armature has been described as rotating and the field magnets as non rotative but it is evident that this might be reversed, the field magnets being directly coupled to the car axle and allowed to rotate and the armature being held from rotation.

Having fully described my invention what I claim as new and desire to secure by Letters Patent is:—

1. The combination with a car-axle and an armature directly connected with the car axle so as to rotate therewith, of a field magnet yoke journaled at its opposite ends on the car axle, said yoke comprising a frame completely encircling the axle and made in separable sections whereby to facilitate its application to the car axle, and three or more pairs of field magnets secured within and completely encircled and protected by the yoke frame, substantially as set forth.

2. The combination with a car axle and an armature directly connected with the car axle so as to rotate therewith, of a field magnet yoke journaled at its opposite ends on the car axle, said yoke comprising a frame which completely encircles the axle and made in separable sections whereby to facilitate its application to the car axle and three or more pairs of field magnets placed on opposite sides of the car axle with their poles pointing toward the axle, said field magnets being secured within and completely encircled and protected by the yoke frame, substantially as set forth.

3. The combination with a car axle and an armature directly connected with the car axle so as to rotate therewith, of a field magnet yoke journaled at its opposite ends on the car axle, said yoke comprising a frame which completely encircles the axle and made in separable sections whereby to facilitate its application to the car axle, and provided with side bars connecting the upper and lower frame pieces of the yoke, and three or more pairs of field magnets placed on opposite sides of the car axle with their poles pointing toward the axle, said field magnets being secured within and completely encircled by the yoke, substantially as set forth.

In testimony whereof I have signed this specification in the presence of two subscribing witnesses.

S. H. SHORT.

Witnesses:
A. B. CALHOUN,
L. S. NOLD.